United States Patent [19]

Graham et al.

[11] 4,105,216

[45] Aug. 8, 1978

[54] MOTOR VEHICLE LEVEL CONTROL CIRCUIT

[75] Inventors: Donald E. Graham, Centerville; Paul J. Long, Jr., Dayton, both of Ohio

[73] Assignee: General Motors Corporation, Detroit, Mich.

[21] Appl. No.: 788,271

[22] Filed: Apr. 18, 1977

Related U.S. Application Data

[63] Continuation-in-part of Ser. No. 635,258, Nov. 25, 1975, abandoned.

[51] Int. Cl.² ............................................. B60G 17/00
[52] U.S. Cl. ................................ 280/6 R; 267/65 D; 280/707
[58] Field of Search ............... 280/6 R, 6 H, 6.1, 707; 267/65 D

[56] References Cited

U.S. PATENT DOCUMENTS

| | | | |
|---|---|---|---|
| 3,269,685 | 8/1966 | Wallace | 280/6.1 |
| 3,610,611 | 10/1971 | Elliot et al. | 280/707 |
| 3,633,935 | 1/1972 | Boyer | 280/707 |
| 3,765,692 | 10/1973 | Barber et al. | 280/6 R |
| 3,830,138 | 8/1974 | Joneleit | 280/707 |
| 3,873,123 | 3/1975 | Joneleit | 280/707 |
| 4,017,099 | 4/1977 | Hegel et al. | 280/707 |

*Primary Examiner*—David M. Mitchell
*Attorney, Agent, or Firm*—Richard G. Stahr

[57] ABSTRACT

Electrical circuits responsive to a logic signal pair produced when the sprung mass of a motor vehicle is above a selected trim band and to another logic signal pair produced when the sprung mass of the vehicle is below the trim band produce respective sprung mass high and sprung mass low signals for a leveling system of the type operative to level the sprung mass of the vehicle within a predetermined trim band in response thereto. A delay circuit effective to inhibit the production of both the sprung mass high and sprung mass low signals for a predetermined time duration is provided to prevent unnecessary operation of the leveling system and respective accumulator circuits inhibit the production of each the sprung mass high and sprung mass low signals at the conclusion of respective predetermined accumulated periods of time.

5 Claims, 9 Drawing Figures

MOTOR VEHICLE LEVEL CONTROL CIRCUIT

This application is a Continuation-in-Part of application Ser. No. 635,258, filed Nov. 25, 1975, now abandoned.

This invention relates to electronic controllers and, more specifically, to a motor vehicle level control circuit for use with motor vehicle leveling systems of the type operative to level the sprung mass of the motor vehicle within a predetermined trim band.

As is well known in the automotive art, the sprung mass of a modern motor vehicle comprises the frame and body and associated components which are spring connected to the unsprung mass of the motor vehicle usually including the wheels, drive train and front and rear axles. To maintain the sprung mass of the motor vehicle within a predetermined trim band as the vehicle load is increased or decreased, automatic electrically operated vehicle leveling systems are frequently employed. That is, the vehicle leveling systems maintain a predetermined height relationship between the sprung and unsprung masses with changes of vehicle load.

With certain automatic leveling systems, a mechanically damped and mechanically operated height sensor electrical switch is employed to indicate an out-of-level condition in either direction. Other vehicle leveling systems include an undamped electrical height sensor switch. A particular disadvantage of these systems is that both respond to normal road movements to operate the system when vehicle leveling correction is not required.

It is, therefore, an object of this invention to provide an improved motor vehicle level control circuit.

It is an additional object of this invention to provide an improved motor vehicle level control circuit for use with motor vehicle leveling systems of the type operative to level the sprung mass of the motor vehicle within a predetermined trim band in response to respective electrical signals indicating the sprung mass of the motor vehicle to be above and below the trim band.

It is a further object of this invention to provide an improved motor vehicle level control circuit for use with motor vehicle leveling systems of the type operative to level the sprung mass of the motor vehicle within a predetermined trim band and includes electronic delay circuitry which prevents vehicle level correction with normal road movements.

It is another object of this invention to provide an improved motor vehicle level control circuit for use with motor vehicle leveling systems of the type operative to level the sprung mass of the motor vehicle within a predetermined trim band in response to respective sprung mass high and sprung mass low electrical signals indicating the sprung mass of the motor vehicle to be above and below the trim band and includes respective accumulator circuitry responsive to the sprung mass high signals and to the sprung mass low signals for inhibiting the production thereof at the conclusion of respective predetermined time periods.

In accordance with this invention, a motor vehicle level control circuit for use with motor vehicle leveling systems of the type operative to level the sprung mass of the motor vehicle within a predetermined trim band in response to respective electrical signals indicating the sprung mass to be above and below the trim band is provided wherein separate respective logic signal pairs are produced when the sprung mass is above and below the trim band and respective electrical circuitry responsive thereto produces sprung mass high and sprung mass low signals which are delayed for a predetermined time duration and which are accumulated for a predetermined period of time and inhibited at the conclusion of this predetermined period of time.

For a better understanding of the present invention, together with additional objects, advantages and features thereof, reference is made to the following description and accompanying drawing in which.

Figure 1:
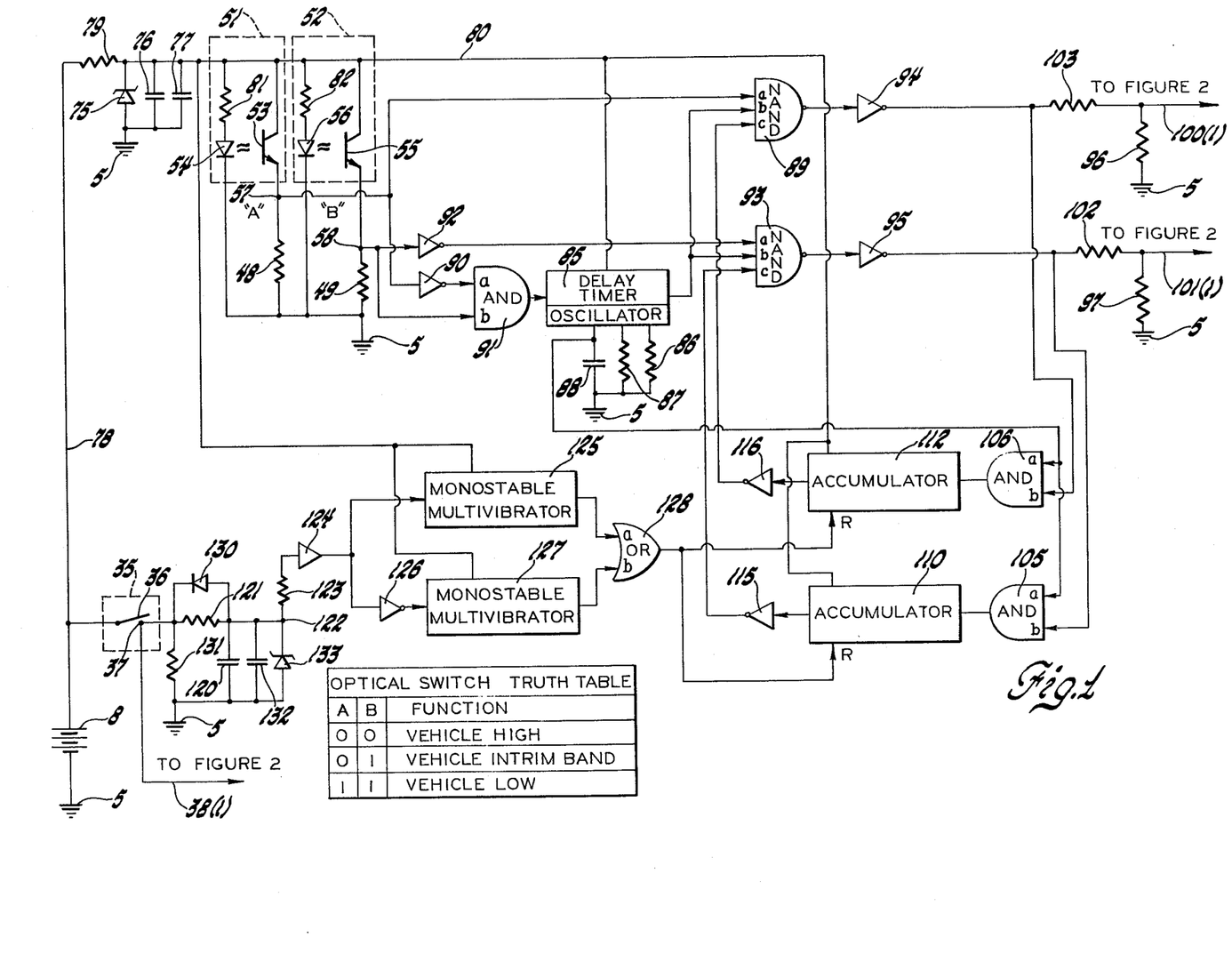
FIG. 1 sets forth the motor vehicle level control circuit of this invention partially in schematic and partially in block form.
Figure 2:
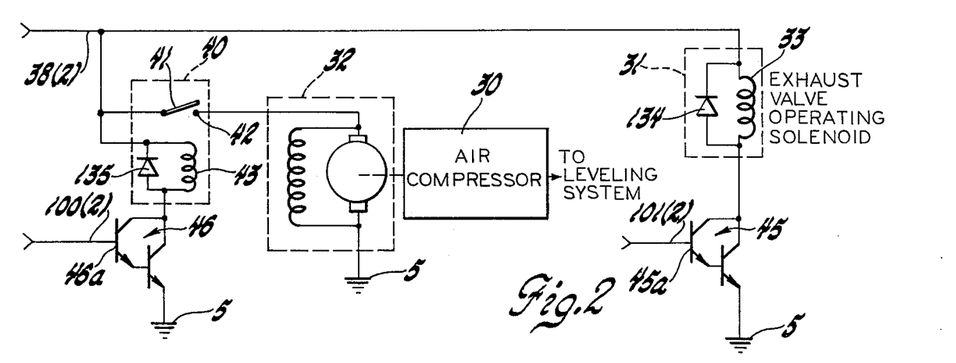
FIG. 2 sets forth the portions of an associated motor vehicle leveling system controlled by the output signals of the circuit of FIG. 1.

Throughout the several Figures of the drawing, like elements have been assigned like characters of reference and, in FIGS. 1 and 2, point of reference or ground potential has been indicated by the accepted schematic symbol and referenced by the numeral 5.

Figure 3:
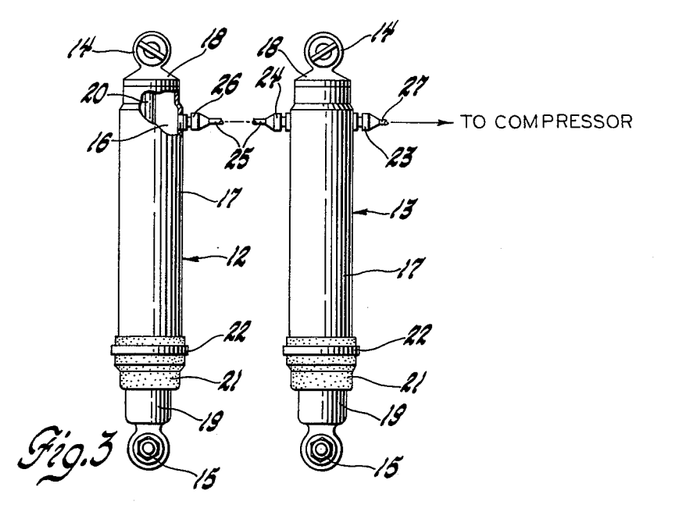
FIG. 3 illustrates a pair of auxiliary load supporting fluid springs of the type normally used with a motor vehicle leveling system.
Figure 4:
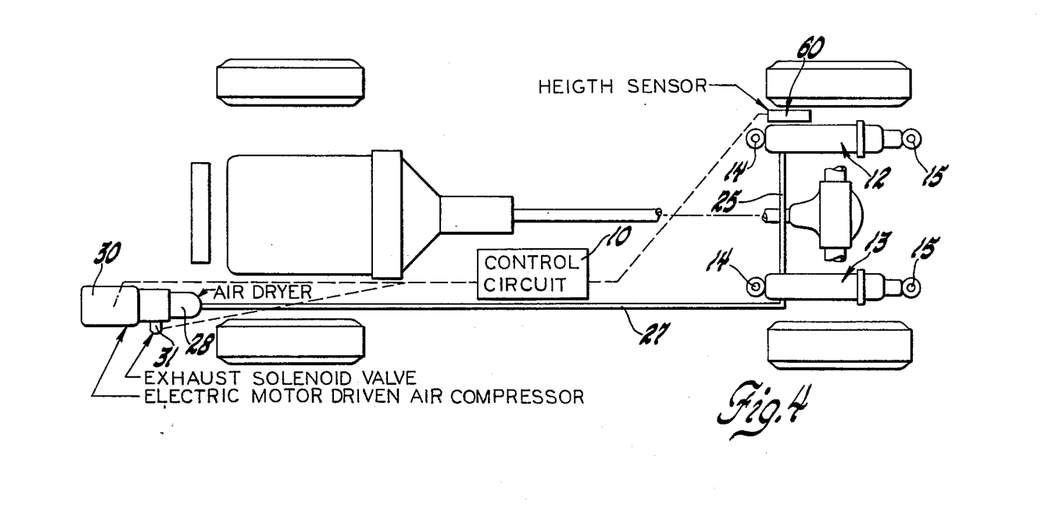
FIG. 4 illustrates generally a modern motor vehicle leveling system.

Referring to FIG. 3 of the drawing, a pair of combination shock absorber and air spring units 12 and 13 of the type suitable for use with a motor vehicle leveling system is set forth. Each of these combination shock absorber and air spring units 12 and 13 includes a top end mount assembly 14 and a bottom end mount assembly 15. The top end mount assembly 14 is adapted to be connected to the frame of a motor vehicle which, along with the body, represents the motor vehicle sprung mass and the bottom end mount 15 is adapted to be connected to a suitable portion of the rear suspension assembly which represents the motor vehicle unsprung mass. Units 12 and 13 represent auxiliary load supporting devices which, in association with primary load supporting springs, maintain a predetermined curb height between the vehicle body and the axle housing when the vehicle is unloaded. To maintain this predetermined curb height or any other predetermined height relationship, the vehicle leveling system is operated to vary the pressure in a variable volume pressurizable fluid chamber 16 of each of units 12 and 13 formed between a dust tube 17 closed at its upper end by a cap 18 and an outer shock absorber cylinder 19. In the illustrated arrangement, the combination shock absorber and air spring unit includes a piston rod 20. The pressurizable fluid chamber 16 is closed by a flexible sleeve 21 that has one end thereof fastened to the open lower end of dust tube 17 by a clamp ring 22 and the opposite end thereof secured to the outer periphery of the cylinder 19 by a like clamp ring, not shown. The pressurizable fluid chamber 16 of the unit 13 has an inlet fitting 23 thereon and an outlet fitting 24 that is joined by a cross-over tube 25 to an inlet fitting 26 to the pressurizable fluid chamber 16 of the unit 12. A common exhaust and supply conduit 27 has one end thereof connected to the inlet fitting 23 and the opposite end thereof connected to an air dryer 28 interconnected with the outlet valve, not shown, of an electric motor driven air compressor 30, as best seen in FIG. 4. The electric motor driven air compressor 30 may be any of the many air compressors driven by a direct current electric motor well-known in the art. It is only necessary that a normally closed solenoid valve 31 in communication with the exhaust and supply conduit 27 be provided.

FIG. 4 schematically represents a motor vehicle leveling system with which the control circuit of this invention may be employed. As leveling systems of this type are well-known in the art, a detailed description thereof is not necessary for this specification which is directed to the control circuit which provides the output signals to which the system of FIG. 4 is responsive to maintain the sprung mass of a motor vehicle within a predetermined trim band. The electronic control circuit of this invention is represented in block form in FIG. 4 and referenced by the numeral 10.

Operating potential for both the motor vehicle leveling system of FIG. 4 and the motor vehicle level control circuit of this invention, to be later explained, may be supplied by a conventional automotive type storage battery 8, schematically illustrated in FIG. 1. Movable contact 36 and stationary contact 37 of electrical switch 35 may be a normally open pair of contacts of a conventional automotive type ignition switch, such as the accessory circuit contacts, which are maintained in the electrical circuit closed position while the engine of an associated automotive vehicle is in the "run" mode. As automotive type ignition switches are well known in the art, a detailed description thereof is not required for this specification. If desirable, electrical switch 35 may be any of the many single pole single throw electrical switches well-known in the art.

An energizing circuit for direct current motor 32 adapted to drive air compressor 30 in any conventional manner may be traced from the positive polarity output terminal of battery 8, FIG. 1, through the electrical contacts 36 and 37 of electrical switch 35, lead 38(1) of FIG. 1 and lead 38(2) of FIG. 2, movable contact 41 and stationary contact 42 of relay 40, direct current motor 32 and point of reference or ground potential 5 to the negative polarity terminal of battery 8. An energizing circuit for the operating solenoid 33 of normally closed solenoid exhaust valve 31 may be traced from the positive polarity output terminal of battery 8, FIG. 1, through the electrical contacts 36 and 37 of electrical switch 35, lead 38(1) of FIG. 1 and lead 38(2) of FIG. 2, operating solenoid 33, the collector-emitter electrodes of NPN transistor Darlington pair 45 and point of reference or ground potential 5 to the negative polarity output terminal of battery 8. An energizing circuit for operating coil 43 of electrical relay 40 may be traced from the positive polarity output terminal of battery 8, FIG. 1, through the electrical contacts 36 and 37 of electrical switch 35, lead 38(1) of FIG. 1 and lead 38(2) of FIG. 2, operating coil 43 of electric relay 40, the collector-emitter electrodes of NPN transistor Darlington pair 46 and point of reference or ground potential 5 to the negative polarity terminal of battery 8. Upon the application of an electrical signal to the base electrode of NPN transistor 46a of NPN transistor Darlington pair 46 in the proper polarity relationship to produce base-emitter drive current through an NPN transistor, NPN transistor Darlington pair 46 conducts through the collector-emitter electrodes thereof to complete the previously described energizing circuit for operating coil 43 of electrical relay 40 and upon the application of an electrical signal to the base electrode of NPN transistor 45a of NPN transistor Darlington pair 45 in the proper polarity relationship to produce base-emitter drive current through an NPN transistor, NPN transistor Darlington pair 45 conducts through the collector-emitter electrodes thereof to complete the previously described energizing circuit for operating coil 33 of normally closed solenoid exhaust valve 31. Should the motor vehicle sprung mass be above the preselected trim band, an electrical control signal applied to the base electrode of NPN transistor 45a of NPN transistor Darlington pair 45 is effective to complete the energizing circuit for operating solenoid 33 of normally closed solenoid exhaust valve 31 which opens this valve to decrease the pressure within variable volume pressurizable fluid chamber 16 of each of combination shock absorber and air spring units 12 and 13 of FIG. 3 to lower the motor vehicle sprung mass. Should the motor vehicle sprung mass be below the preselected trim band, an electrical control signal applied to the base electrode of NPN transistor 46a of NPN transistor Darlington pair 46 is effective to complete the energizing circuit for direct current motor 32 adapted to drive air compressor 30 to increase the pressure within variable volume pressurizable fluid chamber 16 of each of combination shock absorber and air spring units 12 and 13 to raise the motor vehicle sprung mass. From this description, it is apparent that the motor vehicle leveling system of FIG. 4 is of the type operative to level the motor vehicle sprung mass within a predetermined trim band in response to respective electrical signals indicating the motor vehicle sprung mass to be above and below the trim band. In a practical application of the control circuit of this invention, the trim band was of a width of 0.625 inches.

Figure 6:
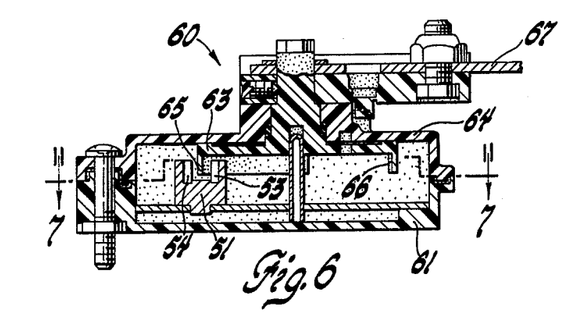
FIG. 6 is a section view of the height sensor of FIG. 5 taken along line 6—6 and looking in the direction of the arrows.

To produce a logic signal pair when the sprung mass of the motor vehicle is above the trim band and another logic signal pair when the sprung mass of the motor vehicle is below the trim band, a pair of optical switches 51 and 52, FIGS. 1, 6 and 7, may be employed. Optical switch units suitable for this application are commercially available items, examples of which are type H13A1 marketed by the General Electric Company and the type TIXL143 marketed by Texas Instruments. The optical switch units 51 and 52 are self-contained, optical switch 51 having a photo transistor 53 so arranged to be light-coupled to a corresponding light-emitting diode 54 and optical switch 52 having a photo transistor 55 arranged to be light-coupled to a corresponding light-emitting diode 56. In a practical application of the control circuit of this invention, a light shuttering arrangement is located between photo transistor 53 and corresponding light-emitting diode 54 of optical switch 51 and between photo transistor 55 and corresponding light-emitting diode 56 of optical switch 52. This light shuttering arrangement is operative to shield photo transistor 53 of optical switch 51 from corresponding light-emitting diode 54 and to shield photo transistor 55 of optical switch 52 from corresponding light-emitting diode 56 while the sprung mass of the motor vehicle is above the trim band; to shield photo transistor 53 of optical switch 51 from corresponding light-emitting diode 54 and to expose photo transistor 55 of optical switch 52 to corresponding light-emitting diode 56 when the sprung mass of the vehicle is within the trim band to expose photo transistor 53 of optical switch 51 to corresponding light-emitting diode 54 and to expose photo transistor 55 of optical switch 52 to corresponding light-emitting diode 56 when the sprung mass of the motor vehicle is below the trim band. As is well known in the art, a photo transistor properly electrically poled for forward conduction is triggered conductive through the current carrying electrodes thereof when exposed to light. While photo transistor 53 is exposed to the light emitted by corresponding light-emitting diode 54, this device conducts through the collector-emitter electrodes and an electrical potential signal appears across resistor 48 of a positive polarity upon junction 57 with respect to point of reference or ground potential 5 and while photo transistor 55 is exposed to the light emitted by corresponding light-emitting diode 56, this device conducts through the collector-emitter electrodes and an electrical potential signal appears across resistor 49 of a positive polarity upon junction 58 with respect to point of reference or ground potential 5. For purposes of easy identification, the output logic signals of the photo transistor-light emitting diode combination 53-54 will be referred to as the "A" signals and the output logic signals of the photo transistor-light emitting diode combination 55-56 will be referred to as the "B" signals. In accordance with logic terminology well-known in the art, throughout this specification these logic signals will be referred to as being in the "high" or logic 1 state or in the "low" or logic 0 state. For purposes of this specification, and without intention or inference of a limitation thereto, the "high" or logic 1 signals will be considered to be of a positive polarity potential and the "low" or logic 0 signals will be considered to be of 0 or ground potential. The truth table for the "A" and "B" signals produced by the optical switch pair 51-52 with the shuttering arrangement of the practical application is set forth in FIG. 1 wherein it is indicated that the optical switch pair 51-52 produces a 0—0 logic signal pair when the sprung mass of the motor vehicle is above the trim band, a 0—1 logic signal pair when the sprung mass of the motor vehicle is within the trim band and a 1—1 logic signal pair when the sprung mass of the motor vehicle is below the trim band. The optical switch pair 51-52, therefore, produces respective logic signal pairs when the sprung mass of the motor vehicle is above the trim band, is within the trim band and is below the trim band.

Figure 5:
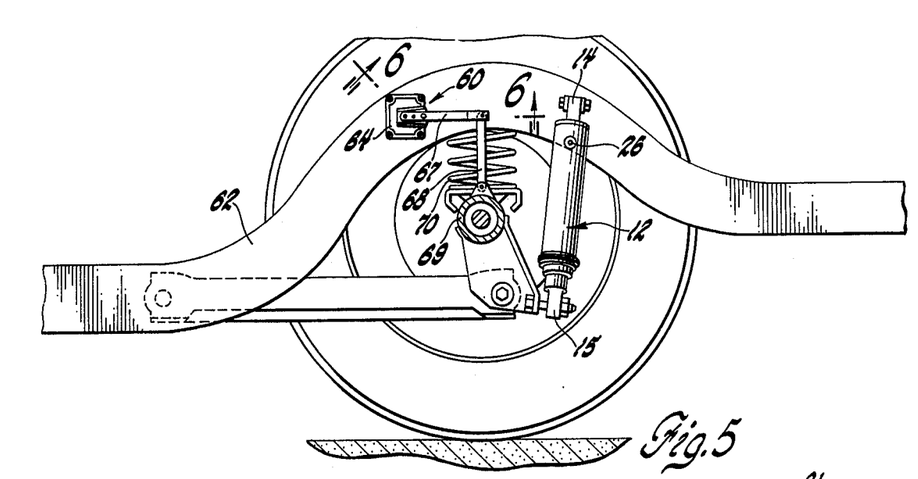
FIG. 5 illustrates in detail one method of mounting the sprung mass height sensor on a motor vehicle.

FIG. 5 illustrates one method for mounting a height sensor, generally shown at 60, upon a motor vehicle. Contained within housing 61 rigidly mounted upon the vehicle frame 62 in any suitable manner are the two optical switches 51 and 52, best shown in FIGS. 6, 7A, 7B and 7C, and a rotor member 63 rotatably mounted in the cover 64 of housing 61. Rotor member 63 includes a first shutter portion 65 arranged to be passed between photo transistor 53 and light-emitting diode 54 of optical switch 51 and a second shutter portion 66 arranged to be passed between photo transistor 55 and light-emitting diode 56 of optical switch 52, as best seen in FIGS. 7A, 7B and 7C. Rotor member 63 is arranged to be rotatable by lever member 67 secured to the portion of the hub of rotor member 63 extending outside housing cover 64. The end of lever member 67 opposite the hub of rotor member 63 is connected to one end of another lever member 68, the other end of which is rigidly secured to the vehicle rear axle housing 69. The motor vehicle frame 62, the vehicle sprung mass, is connected to the rear axle housing 69, the vehicle unsprung mass, by a conventional coil spring 70, as is well known in the automotive art.

Figure 7A:
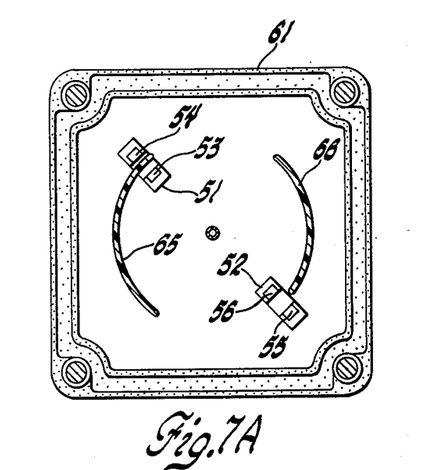
FIGS. 7A, 7B and 7C are section views of the height sensor of FIG. 6, taken along line 7—7 and looking in the direction of the arrows, when the sprung mass is high, in trim and low, respectively.

Housing member 61 and lever members 67 and 68 are so located and proportioned that when the vehicle sprung mass is within the trim band, shutter member 65 shields photo transistor 53 of optical switch 51 from the light emitted by corresponding light-emitting diode 54 and phototransistor 55 of optical switch 52 is exposed to the light emitted by corresponding light-emitting diode 56, as best shown in FIG. 7A. The optical switch pair 51-52, therefore, produces a logic 0-1 signal pair when the sprung mass is within the trim band.

Figure 7B:
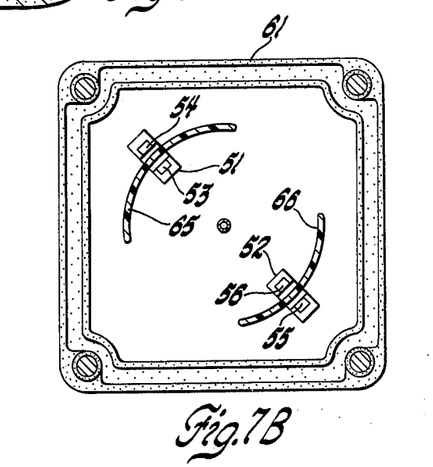

Should the sprung mass rise above the trim band, rotor member 63 is rotated in a clockwise direction whereby shutter member 65 is rotated to a position between photo transistor 53 and light-emitting diode 54 of optical switch 51 and shutter member 66 is rotated to a position between photo transistor 55 and light-emitting diode 56 of optical switch 52, as best shown in FIG. 7B. The optical switch pair 51-52, therefore, produces a logic 0—0 signal pair when the vehicle sprung mass is high.

Figure 7C:
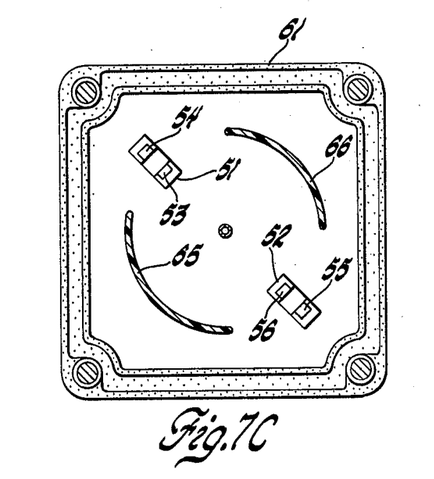

Should the sprung mass depress below the trim band, rotor member 63 is rotated in a counterclockwise direction whereby shutter member 65 is rotated to a position at which it is not between phototransistor 53 and light-emitting diode 54 of optical switch 51 and shutter member 66 is rotated to a position at which it is not between photo transistor 55 and light-emitting diode 56 of optical switch 52, as best shown in FIG. 7C. The optical switch pair 51-52, therefore, produces a logic 1—1 signal pair when the vehicle sprung mass is low.

The potential of battery 8 is applied across the parallel combination of Zener diode 75 and capacitors 76 and 77 through lead 78 and resistor 79. The combination of resistor 79 and capacitor 76 comprise a ripple filter and capacitor 77 provides a low impedance path to ground 5 for high frequency transients. Zener diode 75 regulates battery potential to a predetermined magnitude, for example 8 volts, which appears across positive polarity potential lead 80 and point of reference or ground potential 5. Light-emitting diodes 54 and 56 are energized across lead 80 and point of reference or ground potential 5 through respective current limiting resistors 81 and 82.

In the preferred embodiment, delay timer circuit 85 includes a commercially available programmable timer marketed by Motorola, Inc. under the type designation MC 14541. This timer consists of a 16-stage binary counter circuit driven by an integral integrated oscillator circuit, the operating frequency of which is determined by external resistors 86 and 87 and capacitor 88. The 16-stage counter divides the oscillator frequency with the $N^{th}$ stage frequency being the operating frequency of the oscillator divided by $2^2$. Outputs are available at the $2^8$, $2^{10}$, $2^{13}$ or $2^{16}$ stages. A logic 1 output appears upon the output terminal of the one of these stages corresponding to the count of the oscillator signals. The integral integrated oscillator circuit is operative while a logic 0 signal is applied to the input terminal and does not operate while a logic 1 signal is applied to the input terminal. As a delay of eight seconds was desired in the practical application, external resistors 86 and 87 and capacitor 88 were proportioned to provide an oscillator operating frequency of 128 cycles per second and the $2^{10}$ output terminal was utilized. That is, counting signals of a frequency of 128 cycles per second, the 16-stage binary counter reaches a count of 1,024 or $2^{10}$ in eight seconds.

When the sprung mass of the motor vehicle is within the trim band, the aforementioned light shuttering arrangement is so operated that the photo transistor 53 is light shielded from corresponding light-emitting diode 54 and photo transistor 55 is exposed to the light emitted from corresponding light-emitting diode 56, FIG. 7A. Consequently, a logic 0 signal is present upon junction 57 and a logic 1 signal is present upon junction 58, the 0-1 logic signal pair produced by the optical switch pair 51-52 while the sprung mass of the motor vehicle is within the trim band. The logic 0 signal present upon junction 57 is applied as a logic 0 signal to input terminal "a" of NAND gate 89 and is inverted by conventional inverter circuit 90 and applied as a logic 1 signal to input terminal "a" of AND gate 91. The logic 1 signal present upon junction 58 is applied as a logic 1 signal to input terminal "b" of AND gate 91 and is inverted by conventional inverter circuit 92 and applied as a logic 0 signal to input terminal "a" of NAND gate 93. With a logic 1 signal present upon both input terminals, AND gate 91 produces a logic 1 output signal. This logic 1 signal is applied to the input terminal of the programmable timer of the delay timer circuit 85, consequently, the integral integrated oscillator does not operate and a logic 0 signal is present upon the $2^{10}$ output terminal of the programmable timer of delay timer circuit 85. This logic 0 signal is applied to input terminal "b" of NAND gate 89 and to input terminal "b" of NAND gate 93. Assuming for the moment that a logic 1 signal is applied to input terminal "c" of NAND gate 89 and to input terminal "c" of NAND gate 93, each of NAND gates 89 and 93 has a logic 0 signal present upon the other two input terminals thereof. Consequently, each of NAND gates 89 and 93 produce a logic 1 output signal which are inverted by respective conventional inverter circuits 94 and 95 to logic 0 signals across respective resistors 96 and 97. The logic 0 signal across resistor 96 is applied through lead 100(1) of FIG. 1 and lead 100(2) of FIG. 2 to the base electrode of NPN transistor 46a of NPN transistor Darlington pair 46 and the logic 0 signal appearing across resistor 97 is applied through the lead 101(1) of FIG. 1 and 101(2) of FIG. 2 to the base electrode of NPN transistor 45a of NPN transistor Darlington pair 45. These logic 0 signals are ineffective to trigger either of these NPN transistor Darlington pairs conductive, consequently, neither the air compressor 30 nor the solenoid valve 31 is activated.

When the sprung mass of the motor vehicle is above the trim band, the aforementioned light shuttering arrangement is so operated that both photo transistors 53 and 55 are shielded from the corresponding respective light-emitting diodes 54 and 56, FIG. 7B. Consequently, a logic 0 signal is present upon both junctions 57 and 58, the 0—0 logic signal pair produced by the optical switch pair 51-52 while the sprung mass of the motor vehicle is above the trim band. The logic 0 signal present upon junction 57 is applied as a logic 0 signal to input terminal "a" of NAND gate 89 and is inverted by conventional inverter circuit 90 and applied as a logic 1 signal to input terminal "a" of AND gate 91. The logic 0 signal present upon junction 58 is inverted by conventional inverter circuit 92 and applied as a logic 1 signal to input terminal "a" of NAND gate 93 and as a logic 0 signal to input terminal "b" of AND gate 91. With a logic 1 signal present upon input terminal "a" and a logic 0 signal present upon input terminal "b", AND gate 91 produces a logic 0 output signal. This logic 0 output signal is applied to the input terminal of the programmable timer of the delay timer circuit 85, consequently, the integral integrated oscillator operates and the output signals thereof are counted by the 16-stage binary counter. While the 16-stage binary counter is counting the output signals of the integral integrated oscillator up to 1,024 counts, a logic 0 signal is present upon the $2^{10}$ output terminal which is applied to input terminal "b" of both NAND gates 89 and 93. Consequently, during this time, both NAND gates 89 and 93 produce a logic 1 output signal. When the 16-stage binary counter reaches a count of 1,024 oscillator output pulses, a logic 1 signal appears upon the $2^{10}$ output terminal thereof which is applied as a logic 1 signal to input terminal "b" of both NAND gates 89 and 93. As a logic 0 signal is still present upon input terminal "a" of NAND gate 89, a logic 1 signal is present upon the output terminal thereof. This logic 1 signal is inverted by conventional inverter circuit 94 to a logic 0 signal across resistor 96 which is ineffective to energize the operating coil 43 of electric relay 40 and, consequently, is ineffective to energize direct current motor 32. Assuming for the moment that a logic 1 signal is present upon input terminal "c" of NAND gate 93, a logic 1 signal is now present upon each of input terminals "a", "b" and "c" of NAND gate 93. With a logic 1 signal present upon each of the input terminals, NAND gate 93 produces a logic 0 output signal which is inverted by conventional inverter circuit 95 to a logic 1 sprung mass high output signal across resistor 97. This logic 1 sprung mass high output signal is applied through current limiting resistor 102 and lead 101(1) of FIG. 1 and lead 101(2) of FIG. 2 to the base electrode of NPN transistor 45a of NPN transistor Darlington pair 45 to trigger these devices conductive through the collector-emitter electrodes thereof which establishes the previously described energizing circuit for operating solenoid 33 of normally closed solenoid exhaust valve 31. Upon the energization of operating solenoid 33, normally closed solenoid exhaust valve 31 is operated to the open position which reduces the pressure within the variable volume pressurizable fluid chamber 16 of each of combination shock absorber and air spring units 12 and 13, thereby lowering the sprung mass of the motor vehicle. When the sprung mass of the motor vehicle has lowered to a position at which it is in the trim band, the optical switch pair 51-52 produces the 0-1 logic signal pair which indicates the sprung mass of the motor vehicle is within the trim band. In a manner previously described, the control circuit of this invention produces two logic 0 output signals when the sprung mass is within the trim band. The logic 0 signal produced by NAND gate 93 is effective to interrupt the energizing circuit for operating coil 33 of normally closed solenoid operated exhaust valve 31, therefore solenoid operated valve 31 operates closed to prevent further reduction of pressure within the variable volume pressurizable fluid chamber 16 of combination shock absorber and air spring units 12 and 13 and the system stabilizes with the sprung mass of the motor vehicle within the trim band.

When the sprung mass of the motor vehicle is below the trim band, the aforementioned light shuttering arrangement is so operated that both photo transistors 53 and 55 are exposed to the light emitted by and, therefore, are light-coupled to the corresponding respective light-emitting diodes 54 and 56, FIG. 7C. Consequently, a logic 1 is present upon both junctions 57 and 58, the 1—1 logic signal pair produced by the optical switch pair 51-52 while the sprung mass of the motor vehicle is below the trim band. The logic 1 signal present upon junction 57 is applied as a logic 1 signal to input terminal "a" of NAND gate 89 and is inverted by conventional inverter circuit 90 and applied as a logic 0 signal to input terminal "a" of AND gate 91. The logic 1 signal present upon junction 58 is inverted by conventional inverter circuit 92 and applied as a logic 0 signal to input terminal "a" of NAND gate 93 and as a logic 1 signal to input terminal "b" of AND gate 91. With a logic 0 signal present upon input terminal "a" and a logic 1 signal present upon input terminal "b", AND gate 91 produces a logic 0 output signal. This logic 0 output signal is applied to the input terminal of the programmable timer of the delay timer circuit 85, consequently, the integral integrated oscillator operates and the output signals thereof are counted by the 16-stage binary counter. While the 16-stage binary counter is counting the output signals of the integral integrated oscillator up to 1,024 counts, a logic 0 signal is present upon the $2^{10}$ output terminal which is applied to input terminal "b" of both NAND gates 89 and 93. Consequently, during this time, both NAND gates 89 and 93 produce a logic 1 output signal. When the 16-stage binary counter reaches a count of 1,024 oscillator output pulses, a logic 1 signal appears upon the $2^{10}$ output terminal thereof which is applied as a logic 1 signal to input terminal "b" of both NAND gates 89 and 93. As a logic 0 signal is still present upon input terminal "a" of NAND gate 93, a logic 1 signal is present upon the output terminal thereof. This logic 1 signal is inverted by conventional inverter circuit 95 to a logic 0 signal across resistor 97 which is ineffective to energize the operating solenoid 33 of normally closed solenoid exhaust valve 31. Assuming for the moment that a logic 1 signal is present upon input terminal "c" of NAND gate 89, a logic 1 signal is now present upon each of input terminals "a", "b" and "c" of NAND gate 89. With a logic 1 signal present upon each of the input terminals, NAND gate 89 produces a logic 0 output signal which is inverted by conventional inverter circuit 94 to a logic 1 sprung mass low output signal across resistor 96. This logic 1 sprung mass low output signal is applied through current limiting resistor 103 and lead 100(1) of FIG. 1 and lead 100(2) of FIG. 2 to the base electrode of NPN transistor 46a of NPN transistor Darlington pair 46 to trigger these devices conductive through the collector-emitter electrodes thereof which establishes the previously described energizing circuit for operating coil 43 of electrical relay 40. Upon the energization of operating coil 43, movable contact 41 is operated into electrical circuit closing engagement with stationary contact 42 to establish the previously described energizing circuit for direct current motor 32. Upon the energization of direct current motor 32, air compressor 30 is operated thereby to increase pressure within the variable volume pressurizable fluid chamber 16 of both combination shock absorber and air spring units 12 and 13, thereby raising the sprung mass of the motor vehicle. When the sprung mass of the motor vehicle has been raised to a position at which it is in the trim band, the optical switch pair 51-52 produces the 0-1 logic signal pair which indicates the sprung mass of the motor vehicle is within the trim band. In a manner previously described, the control circuit of this invention produces two logic 0 output signals when the sprung mass of the motor vehicle is within the trim band. The logic 0 signal produced by NAND gate 89 is effective to interrupt the energizing circuit for direct current motor 32, therefore, air compressor 30 ceases to be further operated thereby and the system stabilizes with the sprung mass of the motor vehicle within the trim band.

From this description, it is apparent that NAND gate 93 is responsive to the 0—0 logic signal pair produced by the optical switch pair 51-52 when the sprung mass of the motor vehicle is above the trim band for producing a sprung mass high signal across resistor 97; that NAND gate 89 is responsive to the 1—1 logic signal pair produced by the optical switch pair 51-52 when the sprung mass of the motor vehicle is below the trim band for producing a sprung mass low signal across resistor 96 and that the delay timer circuit 85 is operatively interconnected with both NAND gates 89 and 93 are effective to inhibit the production of both the sprung mass high and sprung mass low signals for a predetermined time duration, in the preferred embodiment eight seconds. The reason for the delay period of eight seconds is to prevent unnecessary leveling system operation with normal road movement as the sprung mass of the motor vehicle bounds and rebounds out of and into the trim band with normal highway driving conditions. The eight second delay period insures that the leveling system is energized only when the sprung mass of the vehicle is loaded enough that it is displaced below the trim band or is unloaded sufficiently that it is displaced above the trim band.

To eliminate unnecessary and prolonged operation of the leveling system in the event of malfunction of the vehicle suspension system or in the event of an external interference which maintains the sprung mass of the motor vehicle above or below the trim band in such a manner that it cannot be corrected by the operation of the leveling system, the motor vehicle level control circuit of this invention includes a feature which provides for control of the associated leveling system only within a predetermined time period. In the practical application of this invention the predetermined time period was arbitrarily selected to be two minutes and eight seconds. While the logic 1 sprung mass high signal is present across resistor 97, it is applied to input terminal "b" of an AND gate 105, while the logic 1 sprung mass low signal is present across resistor 96, it is applied to input terminal "b" of AND gate 106 and the output of the integral integrated oscillator of the programmable timer of the delay timer circuit 85 is applied to the input terminal "a" of both AND gates 105 and 106. The output terminal of AND gate 105 is applied to the input of an accumulator circuit 110 and the output of AND gate 106 is applied to the input of accumulator circuit 112. Accumulator circuits 110 and 112 are commercially available devices marketed by Motorola as type MC 14020 14-bit binary counters having buffered outputs available from stages 1 and 4 through 14. As the output frequency of the integral integrated oscillator of the programmable timer of the delay timer circuit 85 was selected to be 128 cycles per second in the preferred embodiment, this oscillator circuit produces 16,384 pulses, which is $2^{14}$, in 2 minutes and 8 seconds. Consequently, the $2^{14}$ output terminal of accumulator circuits 110 and 112 are employed and the output signals appearing thereon are applied through respective conventional inverter circuits 115 and 116 to input terminal "c" of respective NAND gates 89 and 93. While the logic 1 sprung mass high signal is present across resistor 97, the output signal pulses of the integral integrated oscillator of the programmable timer of the delay timer circuit 85 are gated through AND gate 105 to the input of accumulator circuit 110. When a count of 16,384 signal pulses has been reached by accumulator circuit 110 in two minutes and eight seconds, a logic 1 signal appears upon the $2^{14}$ output terminal thereof which is inverted to a logic 0 signal by conventional inverter circuit 115 and applied as a logic 0 signal to input terminal "*c*" of NAND gate 93. With a logic 0 signal upon input terminal "*c*", NAND gate 93 will produce a logic 1 output signal regardless of the combination of logic signals present upon the other input terminals "*a*" and "*b*" thereof. This logic 1 output signal is inverted by conventional inverter circuit 95 to a logic 0 signal across resistor 97 which is ineffective to operate solenoid operated valve 31. While the logic 1 sprung mass low signal is present across resistor 96, the output signal pulses of the integral integrated oscillator of the programmable timer of the delay timer circuit 85 are gated through AND gate 106 to the input of accumulator circuit 112. When a count of 16,384 signal pulses has been reached by accumulator circuit 112 in two minutes and eight seconds, a logic 1 signal appears upon the $2^{14}$ output terminal thereof which is inverted to a logic 0 signal by conventional inverter circuit 116 and applied as a logic 0 signal to input terminal "*c*" of NAND gate 89. With a logic 0 signal present upon input terminal "*c*", NAND gate 89 produces a logic 1 output signal regardless of the combination of logic signals present upon the other input terminals "*a*" and "*b*" thereof. This logic 1 output signal is inverted by conventional inverter circuit 94 to a logic 0 signal across resistor 96 which is ineffective to effect the energization of direct current motor 32 which drives air compressor 30. After the sprung mass high signal has been present for an accumulated period of time, two minutes and eight seconds in the practical application, further production of this signal is inhibited by accumulator circuit 110 and after the sprung mass low signal has been present for an accumulated period of time, two minutes and eight seconds in the practical application, further production of this signal is inhibited by accumulator circuit 112. For the control circuit of this invention to be effective thereafter, accumulator circuits 110 and 112 must be reset.

From this description, it is apparent that accumulator circuit 110 is responsive to the sprung mass high signal for accumulating the time the sprung mass high signal is present and for inhibiting the production of the sprung mass high signal at the conclusion of a predetermined time period and that accumulator circuit 112 is responsive to the sprung mass low signal for accumulating the time the sprung mass low signal is present and for inhibiting the production of the sprung mass low signal at the conclusion of a predetermined time period.

As accumulator circuits 110 and 112 accumulate, respectively, the period of time the sprung mass high and sprung mass low signals are present, it is necessary that these circuits be reset each time the ignition switch is turned "on" and "off".

When movable contact 36 of electrical switch 35 is operated into electrical circuit closing engagement with stationary contact 37, capacitor 120 charges exponentially across battery 8 through resistor 121. The plate of capacitor 120 which is charged to a positive polarity potential is connected through junction 122 and current limiting resistor 123 to the input terminal of a conventional buffer amplifier circuit 124. When the charge upon capacitor 120 reaches the trigger level of buffer amplifier circuit 124, this device abruptly switches the output signal thereof from substantially ground potential to a positive polarity potential to produce a substantially square wave form output signal. This logic 1 output signal of buffer amplifier 124 is applied to the input terminal of a conventional monostable multivibrator circuit 125 and is inverted by conventional inverter circuit 126 and applied as a logic 0 signal to the input terminal of a conventional monostable multivibrator circuit 127. Consequently, when capacitor 120 has charged to the trigger level of buffer amplifier circuit 124, the resulting logic 1 output signal triggers monostable multivibrator circuit 125 to the alternate state in which a logic 1 signal is present upon the output terminal thereof. This logic 1 output signal is applied to input terminal "*a*" of OR gate 128 and appears as a logic 1 signal upon the output terminal thereof which is applied to the reset terminal of both accumulator circuits 110 and 112 to reset these devices upon the operation of movable contact 36 into electrical circuit closing engagement with stationary contact 37. When movable contact 36 is operated out of electrical circuit closing engagement with stationary terminal 37, capacitor 120 discharges exponentially through the parallel combination of resistor 121 and diode 130 and series resistor 131. When the charge upon capacitor 120 has reduced to a value below the trigger level of buffer amplifier circuit 124, this device abruptly switches the output signal thereof from a positive polarity to substantially ground potential. This logic 0 output signal of buffer amplifier 124 is applied to the input terminal of monostable multivibrator circuit 125 and is inverted by conventional inverter circuit 126 and applied as a logic 1 signal to the input terminal of monostable multivibrator 127. Consequently, when capacitor 120 has discharged below the trigger level of buffer amplifier circuit 124, the resulting logic 0 output signal is inverted to a logic 1 signal which triggers monostable multivibrator circuit 127 to the alternate state in which a logic 1 signal is present upon the output terminal thereof. This logic 1 output signal is applied to input terminal "*b*" of OR gate 128 and appears as a logic 1 signal upon the output terminal thereof which is applied to the reset terminal of both accumulator circuits 110 and 112 to reset these devices upon the operation of movable contact 36 out of electrical circuit closing engagement with stationary contact 37.

As has been previously brought out, delay timer circuit 85 is effective to inhibit the production of both the sprung mass high and sprung mass low signals for a predetermined time duration, in the preferred embodiment eight seconds. The output signals of a frequency of 128 cycles per second produced by the integral integrated oscillator circuit of the MC-14541 programmable timer are counted by the included binary counter which reaches a count of 1,024 pulses in eight seconds to provide the eight second delay. As the delay period is determined by the length of time required for a binary counter to reach a predetermined count of electrical signals of a selected constant frequency, it is necessary that the binary counter be reset to zero each time the sprung mass has returned to a position within the trim band to maintain the selected delay period with conditions of operation during which the sprung mass is rapidly bounding and rebounding out of and into the trim band position. For this reason, the MC-14541 programmable timer was selected for this application because the associated binary counter is reset to zero each time a logic 1 signal, the logic signal produced by AND gate 91 when the position of the sprung mass is within the trim band, is impressed upon the input terminal thereof. It is to be specifically understood, however, that alternate methods of providing the delay period and for resetting the delay period may be employed without departing from the spirit of the invention.

Capacitor 132 provides transient protection and Zener diode 133 regulates battery potential to a magnitude compatible with the remainder of the circuit, for example, nine volts. Diodes 134 and 135 of FIG. 2 are conventional and well known "free wheeling" diodes which prevent excessive potentials in reactive coils 33 and 43 upon the interruption of the energizing circuits thereof.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A motor vehicle level control circuit for use with motor vehicle leveling systems of the type operative to level the sprung mass of the motor vehicle within a predetermined trim band in response to respective electrical signals indicating the sprung mass to be above and below the trim band comprising: means for producing a first logic signal pair when the sprung mass is above the trim band and another second logic signal pair when the sprung mass is below the trim band; first circuit means responsive to said first logic signal pair for producing a sprung mass high signal; second circuit means responsive to said second logic signal pair for producing a sprung mass low signal; means responsive to said sprung mass high signal for effecting the lowering of said sprung mass; means responsive to said sprung mass low signal for effecting the raising of said sprung mass; third circuit means responsive to said sprung mass high signal for accumulating the time said sprung mass high signal is present and for inhibiting the production of said sprung mass high signal at the conclusion of a predetermined time period whereby said means responsive to said sprung mass high signal is disabled at the conclusion of said predetermined time period; and fourth circuit means responsive to said sprung mass low signal for accumulating the time said sprung mass low signal is present and for inhibiting the production of said sprung mass low signal at the conclusion of a predetermined time period whereby said means responsive to said sprung mass low signal is disabled at the conclusion of said predetermined time period.

2. A motor vehicle level control circuit for use with motor vehicle leveling systems of the type operative to level the sprung mass of the motor vehicle within a predetermined trim band in response to respective electrical signals indicating the sprung mass to be above and below the trim band comprising: means for producing a first logic signal pair when the sprung mass is above the trim band and another second logic signal pair when the sprung mass is below the trim band; first circuit means responsive to said first logic signal pair for producing a sprung mass high signal; second circuit means responsive to said second logic signal pair for producing a sprung mass low signal; delay circuit means effective to inhibit the production of both said sprung mass high and sprung mass low signals for a predetermined time duration; means responsive to said sprung mass high signal for effecting the lowering of said sprung mass; means responsive to said sprung mass low signal for effecting the raising of said sprung mass; third circuit means responsive to said sprung mass high signal for accumulating the time said sprung mass high signal is present and for inhibiting the production of said sprung mass high signal at the conclusion of a predetermined time period whereby said means responsive to said sprung mass high signal is disabled at the conclusion of said predetermined time period; and fourth circuit means responsive to said sprung mass low signal for accumulating the time said sprung mass low signal is present and for inhibiting the production of said sprung mass low signal at the conclusion of a predetermined time period whereby said means responsive to said sprung mass low signal is disabled at the conclusion of said predetermined time period.

3. A motor vehicle level control circuit for use with motor vehicle leveling systems of the type operative to level the sprung mass of the motor vehicle within a predetermined trim band in response to respective electrical signals indicating the sprung mass to be above and below the trim band comprising: and optical coupler arrangement of the type including a pair of light sources and a pair of photosensitive signal generating devices, each optically coupled to a respective one of said pair of light sources for producing a first logic signal pair when the sprung mass is above the trim band, a second other logic signal pair when the sprung mass is below the trim band and a third other logic signal pair when the sprung mass is within the trim band; first circuit means responsive to said first logic signal pair for producing a sprung mass high signal; second circuit means responsive to said second logic signal pair for producing a sprung mass low signal; delay circuit means effective to inhibit the production of both said sprung mass high and sprung mass low signals for a predetermined time duration; means responsive to said sprung mass high signal for effecting the lowering of said sprung mass; and means responsive to said sprung mass low signal for effecting the raising of said sprung mass.

4. A motor vehicle level control circuit for use with motor vehicle leveling systems of the type operative to level the sprung mass of the motor vehicle within a predetermined trim band in response to respective electrical signals indicating the sprung mass to be above and below the trim band comprising: means for producing a first logic signal pair when the sprung mass is above the trim band and another second logic signal pair when the sprung mass is below the trim band; first circuit means responsive to said first logic signal pair for producing a sprung mass high signal; second circuit means responsive to said second logic signal pair for producing a sprung mass low signal; delay circuit means effective to inhibit the production of both said sprung mass high and sprung mass low signals for a predetermined time duration; means responsive to said sprung mass high signal for effecting the lowering of said sprung mass; means responsive to said sprung mass low signals for effecting the raising of said sprung mass; third circuit means responsive to said sprung mass high signal for accumulating the time said sprung mass high signal is present and for inhibiting the production of said sprung mass high signal at the conclusion of a predetermined time period whereby said means responsive to said sprung mass high signal is disabled at the conclusion of said predetermined time period; and fourth circuit means responsive to said sprung mass low signal for accumulating the time said sprung mass low signal is present and for inhibiting the production of said sprung mass low signal at the conclusion of a predetermined time period whereby said means responsive to said sprung mass low signal is disabled at the conclusion of said predetermined time period; and reset circuit means for resetting said third and fourth circuit means upon both the application and removal of operating potential.

5. A motor vehicle level control circuit for use with motor vehicle leveling systems of the type operative to level the sprung mass of the motor vehicle within a predetermined trim band in response to respective electrical signals indicating the sprung mass to be above and below the trim band comprising: an optical coupler arrangement of the type including a pair of light sources and a pair of photosensitive signal generating devices, each optically coupled to a respective one of said pair of light sources for producing a first logic signal pair when the sprung mass is above the trim band and another second logic signal pair when the sprung mass is below the trim band; first circuit means responsive to said first logic signal pair for producing a sprung mass high signal; second circuit means responsive to said second logic signal pair for producing a sprung mass low signal; delay circuit means effective to inhibit the production of both said sprung mass high and sprung mass low signals for a predetermined time duration; means responsive to said sprung mass high signal for effecting the lowering of said sprung mass; means responsive to said sprung mass low signal for effecting the raising of said sprung mass; and means for resetting said delay circuit means to zero when said sprung mass goes into said trim band.

* * * * *

UNITED STATES PATENT AND TRADEMARK OFFICE
CERTIFICATE OF CORRECTION

PATENT NO. : 4,105,216
DATED : August 8, 1978
INVENTOR(S) : Donald E. Graham, Paul J. Long, Jr.

It is certified that error appears in the above-identified patent and that said Letters Patent are hereby corrected as shown below:

Column 6, line 56, "$2^2$" should read -- $2^n$ --.

Column 10, line 16, "are" should read -- and --.

Signed and Sealed this

Sixth Day of February 1979

[SEAL]

Attest:

RUTH C. MASON
Attesting Officer

DONALD W. BANNER
Commissioner of Patents and Trademarks